United States Patent [19]

Neefe

[11] Patent Number: 4,511,450
[45] Date of Patent: Apr. 16, 1985

[54] PASSIVE HYDROGEL FUEL GENERATOR

[76] Inventor: Charles W. Neefe, 811 Scurry St., Big Spring, Tex. 79720

[21] Appl. No.: 586,352

[22] Filed: Mar. 5, 1984

[51] Int. Cl.³ .......................... C25B 1/04; C25B 1/06
[52] U.S. Cl. .................................... 204/278; 204/129; 204/157.1 R; 204/DIG. 3; 48/62 R; 422/186; 429/111
[58] Field of Search ................ 422/186; 204/128, 129, 204/278, DIG. 3, 157.1 R; 429/111; 48/62 R

[56] References Cited

U.S. PATENT DOCUMENTS

| 4,211,620 | 7/1980 | Fowler | 204/129 |
| 4,256,814 | 3/1981 | Avigal et al. | 429/111 |
| 4,465,964 | 8/1984 | Cover | 322/2 R |

Primary Examiner—Aaron Weisstuch

[57] ABSTRACT

A passive hydrogen oxygen generator in which the long wavelength infrared portion of the sun's spectrum heats water to provide circulation of the water within the generator. The shorter wavelength portion of the spectrum to which water is transparent is used in splitting water into hydrogen and oxygen by photoelectrolysis.

5 Claims, 1 Drawing Figure

PASSIVE HYDROGEL FUEL GENERATOR

PRIOR ART

U.S. Pat. No. 4,401,371 issued Aug. 30, 1983 to Charles W. Neefe, entitled; "Hydrogel Oxygen Generator With Improved Fluid Flow" describes a hydrogel polymer containing micro-photoelectrolysis elements and capillary tubes within the polymer.

U.S. Pat. No. 4,268,132 issued May 19, 1981 to Charles W. Neefe, entitled; "Oxygen Generating Contact Lens" describes a contact lens containing micro-photoelectrolysis elements to produce oxygen from water.

IN THE DRAWINGS

FIG. 1 shows the generator in section.

SUMMARY OF THE INVENTION

Natural photosynthesis provides the most obvious example of photochemical solar energy conversion. Field efficiency (yearly average, best crops and so on) is about 1%. These figures are not so high as the efficiency for electricity generation by solid-state photovoltaics. Sunlight-induced photoelectrolysis conversion of water to hydrogen and oxygen approaches the field of efficiency of natural photosynthesis. Solid-state photovoltaic devices are the only man-made systems having any wide spread use for solar energy conversion based on electronic excitations. Solid/liquid junction devices represent the best chemical systems for converting light energy to hydrogen and oxygen from water. The most impressive systems for solar energy conversion to electricity and production of oxygen from water involve the interfacial photoredox events at the junction between semiconductors and liquid electrolyte solutions. Semiconductor/liquid junction cells are different from photogalvanic cells in that light is absorbed by a solid electrode, not by electrolyte species in solution. Two of the most efficient systems for the photoelectrolysis of water are the strontium titanium trioxide based cell and gallium arsinide cells. The overall efficiency of converting solar energy to hydrogen and oxygen is about 1%. N-type titanium dioxide/p-type gallium phosphorus based cells produce hydrogen and oxygen with no other energy input than the light striking the two electrodes. This type of observation led to the conclusion that "photochemical diodes" consisting of aqueous suspensions of n-type titanium dioxide/p-type gallium phosphorus particles can yield hydrogen and oxygen from water upon optical excitation. Another approach is to sensitize stable semiconductors using visible light absorbing dyes attached to the surface. In this approach, the aim is to absorb light by a dye layer on the semiconductor surface to produce an excited state; this has been achieved by using zinc oxide sensitized with rose bengal.

The carrier material containing the photo-receptors may by any hydrogel water containing material. Examples of carrier materials are polyhydroxyethyl methacrylate, polyhydroxypropyl methacrylate, and hydratable polymethylmethacrylate polyvinylpyrrolidinone.

Photosensitive particles are suspended in the monomers and a suitable catalyst is added to achieve polymerization. The photosensitive particles are selected from the following semiconductors: titanium dioxide combined with gallium phosphorus; platinum combined with strontium titanium trioxide, tin oxide combined with a dye; or zinc oxide combined with rose bengal dye. Ferric oxide, titanium dioxide, tin oxide, titanium oxide, and zinc oxide photoanodes may be used in combination with a noble metal such as platinum. After polymerization, the polymer containing the photosensitive particles imbedded in clear transparent polymer is hydrated. After hydration, the liquid semiconductor junction is established at the photosensitive interface and hydrogen and oxygen will be released by the electrolysis of water upon exposure to light.

The absorption bandwidth, i.e. the colors of light capable of initiating the photovoltaic effect, are increased by addition of dyes such as rose bengal which increase the amount of light absorbed and the efficiency. 2-Methyl 8 quinolinal added to titanium dioxide and platinum photovoltaic diode will increase the absorption bandwith and the amount of hydrogen produced.

The rate at which gases are generated will not exceed the solubility limits of the water contained within the polymer matrix. The solubility of hydrogen and oxygen in water is dependent on the temperature. At a temperature of 0° C. and 760 m/m pressure, 21.4 ml of hydrogen and 49.6 ml of oxygen are soluble in a liter of water. At a temperature of 100° C. the solubility drops to 0.

Micro-capillary tubes ranging in diameter from 0.001 m/m to 1.0 m/m may be incorporated in the hydrogel structure, or they preferably may pass completely through the hydrogel. The inlet port, and outlet port, are connected by the continuous tube. The presence of these tubes provides for faster exchange of the electrolyte and increased production of hydrogen and oxygen. The tubes are formed by imbedding a fiber within the monomer before polymerization and dissolving the fibers from the polymerized material. Glass fibers may be imbedded and later removed with hydrofluoric acid after the polymer is formed to create the micro-tubes. Water soluble fibers such as spun sugar (cotton candy) may be used.

A sulfonate or a phosphorus group may be incorporated in the polymer matrix to increase the mobility of the water and prevent fouling of the exterior polymer surface. Fouling of the surface of the imbedded photosensitive particles by debris is prevented by the presence of the hydrogel matrix which completely surrounds the particles. Contamination has been the common cause of photoelectrolysis shut-down, the occluding of the photodiode due to surface contamination. Most debris particles are hydrophobic, or in other words, repel water; most of them also bear a negative electric charge. The most serious debris problems are caused by materials such as oily particles and proteins, which have large surface areas that are hydrophobic, or in other words repel water. When a hydrophobic substance is in an aqueous environment, it can reduce its total energy by reducing the area exposed to the water; two hydrophobic particles tend to clump together expelling the water from the space between them and thereby reducing their exposed surface. This phenomenon is called hydrophobic bonding. In the same way such a particle can be held to the surface by the elimination of repulsive interactions with the surrounding water. Most of the debris materials also bear a negative electric charge and hydrogen bonding involving these charges also contributes to the buildup of debris. In this kind of bonding the slight positive charge of hydrogen atom at the surface attracts a negatively charged group in the debris particle.

In liquid water about half the molecules at any moment are in clusters that have the same orderly structure as a crystal of ice. In the clusters, each water molecule is placed so that the oxygen atom occupies the vertex of a tetrahedron and so that a hydrogen bond connects each pair of water molecules. In ice, this stable structure extends over a long distance, but in the liquid state, the icelike clusters generally include only a few molecules each, and they are constantly forming and disintegrating. Inside the structure of a negative charged hydrophilic polymer, the water assumes an icelike state, in which the molecules have an orderly arrangement and are held together by hydrogen bonds. The geometry of the icelike state is tetrahedral, with each oxygen atom surrounded by four others at equal distances. Other molecules and particles are rejected, including not only those that are too large to fit through the membrane but also small molecules that cannot conform to the icelike structure. Ions in particular are excluded because they are shielded by a layer of water that would disrupt the icelike lattice. In the production of hydrogen and oxygen for fuels, this ability to control the presence of ions and catalysts at the reactive site is a tremendous asset. With the ability to control the flow of ions, catalysts, and dissolved gases, it is possible to produce carbohydrates from water and dissolved carbon dioxide with the energy for the uphill reaction supplied by light and the photosensitive materials imbedded within a water containing polymer.

The liquid/solid junction is made with the electrolyte contained within the matrix of the polymer material. This provides unique conditions of self regulation and supplying a permanent, contamination free, liquid to solid interface. These properties separate or together offer many improvements in other applications of solar energy. Self regulation occurs when $O_2$ or $H_2$ are produced at a rate greater than the migration rate into the polymer matrix away from the reaction site where the gases are formed. When a layer of undissolved gas accumulates on the surface of the reaction site, the water is displaced and further gas production stops until the gas dissolves or is free to migrate into the micro-tubes and is conducted to the surface of the polymer.

Starting with the bare semiconductor, they could be treated like large molecules. For instance, when the colloid suspension served as the electrolyte in an electrochemical cell, the particles behaved like huge ions, giving up about 500 electrons to one of the electrodes. This "Hoovering" of electrons, can change the colloid particles from n-type to p-type.

When platinum is deposited on the particles, it is as if the colloid particle ceases to be a semiconductor and becomes an insulator. After the particle has been "hoovered" of electrons, none is left to act as charge-carrier. The result is that the particle now behaves as a low-band gap insulator. It is possible to generate hydrogen using colloidial suspensions of cheaper undoped semiconductors coated with small amounts of platinum.

DESCRIPTION OF THE PREFERRED EMBODIMENT

Figure 1:
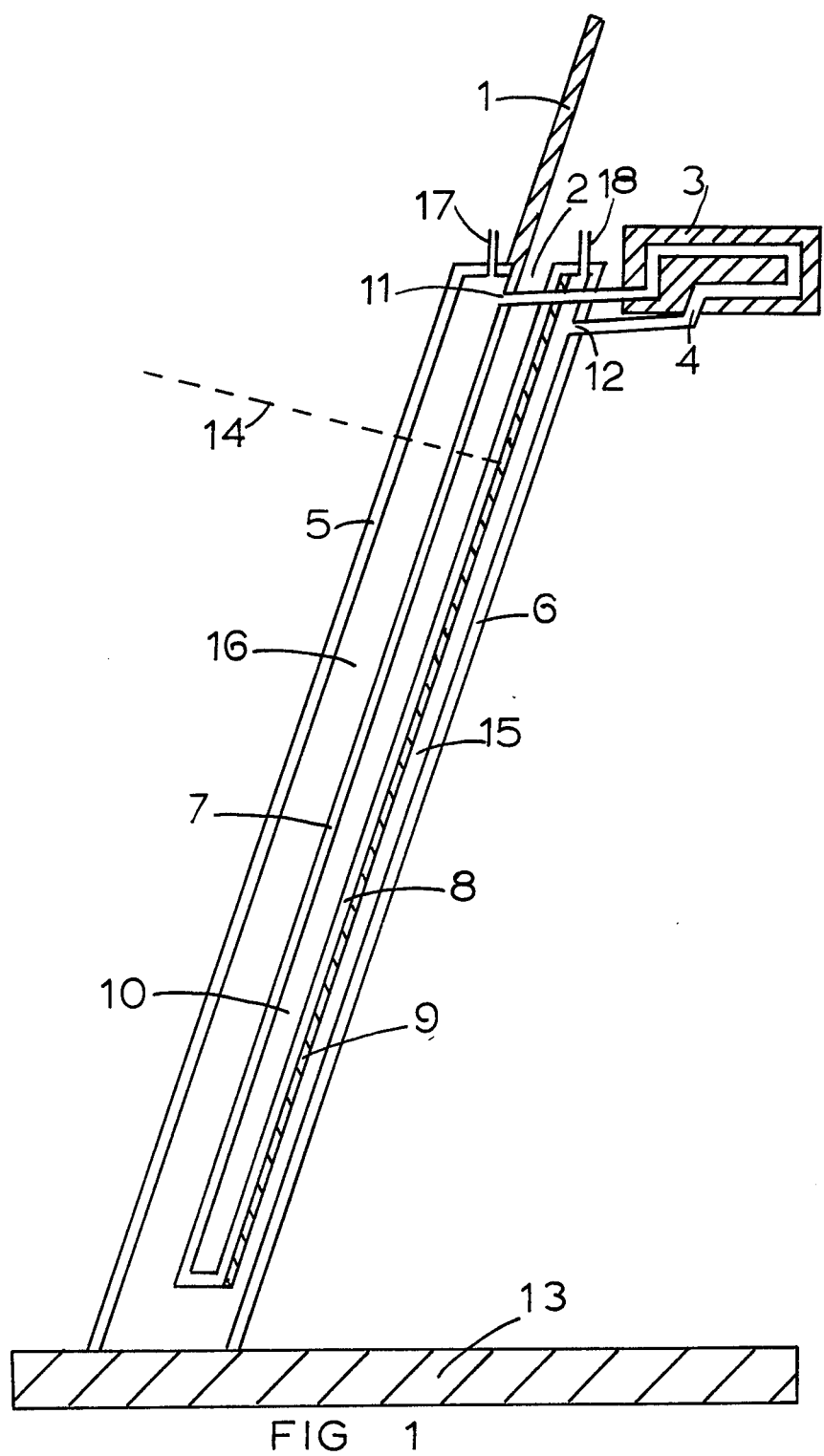

Photosensitive particles are mixed with the monomer hydroxyethyl methacrylate, 2% of the crosslinker ethylene glycol dimethacrylate and 0.25% of the catalyst 2,2 Axobis (2-methylpripionitrite), the mixture is purged of oxygen and sugar fibers are suitably placed in the liquid monomer containing the photosensitive particles. The monomer mixture is cast as a thin layer on a transparent acrylic sheet and placed under a nitrogen blanket and heated to 55° C. for twelve hours and post cured for 8 hours at 70° C. The fibers are removed by being dissolved and the polymer is fully hydrated. When the polymer is exposed to light, an electric potential will be present across the semiconductor liquid junction and hydrogen will be released. The water present within the hydrophilic material acts as the required electrolyte and as a reservoir for the dissolved hydrogen which may move through the material into the capillary tubes by diffusion and from the polymer material by way of the micro-capillary tubes.

THE PASSIVE SYSTEM FUNCTIONS AS FOLLOWS

Water contained in the front chamber 16 (FIG. 1), is warmed by solar radiation 14 passing through the transparent cover 5 FIG. 1. The infrared energy of the sun's spectrum is absorbed by water. The warmed water, being lighter, will slowly rise in chamber 16. The cooler water in the thin chamber 15 will move downward at a higher velocity than the larger volume rising in chamber 16. The temperature difference is maintained by the loss of heat in the heat exchanger 3, which exchanges the heat from the water to the atmosphere, and is protected from solar radiation by the screen 1. Heat transfer between the warmer chamber, 16 FIG. 1 and the cooler chamber 15 is reduced by the air space 10, which is open to the atmosphere on the top 2 and two sides. Hydrogen and oxygen are produced in the transparent hydrophilic polymer containing the photosensitive particles. The hydrogen and oxygen are dissolved in the cooler water in chamber 15 and pass below the air space 10 and into the larger chamber 16, where solar heating by infrared radiation occurs while moving slowly upward by convection. The ability to hold dissolved gases decreases as the temperature increases and a portion of the dissolved gases is released as bubbles when the water becomes oversaturated rises to the top and removed through the gas escape valve 17, and the hot water moves out through opening 11 and into the heat exchanger 3. Convection air currents cool the water which leaves the heat exchanger through opening 4 and enters chamber 15 through opening 12 as cool water. The cool water moving rapidly through the low volume chamber 15 again becomes saturated with hydrogen and oxygen from the photoactive layer 9. A second gas escape valve 18 is provided in the top of chamber 15 to remove any gas which may be present in this chamber. This valve presents shut-down due to a gas lock in the system. The active surface, 9 is held in the position to intersect the suns rays, 14 at a 90° angle by the support base 13.

The transparent surfaces 5, 7, and 8 are transparent to ultraviolet and visible wavelengths of light. Materials such as acrylics are used for these surfaces. The water in compartment 16 is transparent to ultraviolet light and the visible spectrum and absorbs the infrared spectrum which heats the water in chamber 16. Infrared is of no value in the production of hydrogen and oxygen by photoelectrolysis, but is useful in providing the heat energy to power the movement of water within the generator by convection. Ultraviolet and visible light which are not absorbed by water are available to be absorbed by the photoreceptors.

The energy of the sun 14 provides infrared to move the water 15 over the hydrogen generator 9 and heat the water 16, thereby reducing the solubility of hydrogen and freeing the gas from the solution when the water becomes oversaturated. Water, being transparent to wavelengths required to produce hydrogen and oxygen from water, transmits said wavelengths to the photoactive receptors which are contained in the membrane 9 where hydrogen is produced and transported by the water layer 15.

Various modifications, of course, can be made without departing from the spirit of this invention or the scope of the appended claims. It is understood that many variations are obtainable which will yield materials as disclosed herein. The constants set forth in this disclosure are given as examples and are in no way final or binding.

I claim:

1. A hydrogen-oxygen generator comprising a first water chamber wherein water is heated by infrared radiation from the sun and by convection; a heat exchanger which removes heat from the water and exchanges the heat to the atmosphere; a second, cooler water chamber; and a sun screen provided to prevent the sun's radiation from reaching the heat exchanger.

2. A hydrogen-oxygen generator as in claim 1 including means for removing the released hydrogen and oxygen gas from the generator.

3. A hydrogen and oxygen generator comprising a first chamber having transparent front and rear surfaces, through which water is circulated and heated by absorbing the infrared portion of the sun's spectrum and dissolved hydrogen and oxygen are released from the over-saturated heated water; means for moving the heated water upward by convection in the first chamber; heat exchanger means for cooling the water and passing the heat to the atmosphere; a second chamber for receiving the lower temperature water and separated from the first heated chamber by an insulating layer of air, said second chamber having a transparent front surface supporting a plurality of photoactive receptors imbedded in a hydrophilic polymer, whereby sunlight is allowed to enter the layer of photoactive receptors and provide dissolved hydrogen and oxygen by photoelectrolysis of the water present in the second chamber, hydrogen and oxygen dissolved in water passing from the second chamber to the first heated chamber through a passageway provided at the lower edges of said chambers.

4. A hydrogen-oxygen generator as in claim 3 including means for removing the released hydrogen and oxygen gas from the generator.

5. A generator as in claim 3 wherein a sun screen is provided to prevent the sun's radiation from reaching the heat exchanger.

* * * * *